United States Patent
Lu

(10) Patent No.: US 10,745,217 B2
(45) Date of Patent: Aug. 18, 2020

(54) BAFFLE BLOCKING TYPE MEDICATION DISPENSING UNIT FOR BOTTLED MEDICATION

(71) Applicant: SUZHOU XINHENG AUTOMATION TECHNOLOGY CO., LTD., Suzhou, Jiangsu (CN)

(72) Inventor: Haiying Lu, Suzhou (CN)

(73) Assignee: SUZHOU XINSHENG AUTOMATION TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 16/314,636

(22) PCT Filed: Jun. 29, 2017

(86) PCT No.: PCT/CN2017/090789
§ 371 (c)(1),
(2) Date: Dec. 31, 2018

(87) PCT Pub. No.: WO2018/001311
PCT Pub. Date: Jan. 4, 2018

(65) Prior Publication Data
US 2019/0315581 A1     Oct. 17, 2019

(30) Foreign Application Priority Data

Jun. 29, 2016 (CN) .......................... 2016 1 0488387

(51) Int. Cl.
*B65G 59/06* (2006.01)
*B65G 1/08* (2006.01)
*B65G 1/137* (2006.01)

(52) U.S. Cl.
CPC .............. *B65G 59/06* (2013.01); *B65G 1/08* (2013.01); *B65G 1/137* (2013.01); *B65G 2201/0244* (2013.01)

(58) Field of Classification Search
None
See application file for complete search history.

(56) References Cited

U.S. PATENT DOCUMENTS 2,813,659 A * 11/1957 Christopher ............ A24F 15/04
                                                   221/234
3,197,063 A *  7/1965 Casey .................... A24F 15/04
                                                   221/195

(Continued)

FOREIGN PATENT DOCUMENTS

| CN | 102602641 A | 7/2012 |
| CN | 103373572 A | 10/2013 |

(Continued)

OTHER PUBLICATIONS

Sep. 26, 2017 International Search Report issued in International Patent Application No. PCT/CN2017/090789.

*Primary Examiner* — Gene O Crawford
*Assistant Examiner* — Ayodeji T Ojofeitimi
(74) *Attorney, Agent, or Firm* — Oliff PLC

(57) ABSTRACT

A baffle blocking medication dispensing unit for bottled medication, wherein: bottled medication is laid flat in the medication container in a single row; the container is arranged at an angle of greater than 10° to make the medication discharging end lower than its rear end and the opening of the medication discharging end is the medication outlet; the medication discharging mechanism includes a dispensing baffle hinged at the medication outlet, and when the baffle is in the state of closing and blocking, it blocks the medication outlet, and when the baffle is in the state of turning over and opening, the baffle is turned down to be connected with the front side of the bottom wall, and the first bottled medication at the dispensing end is dispensed for- (Continued)

ward on the straight plate portion of the baffle and the blocking portion blocks the second bottled medication at the dispensing end.

4 Claims, 2 Drawing Sheets

(56) References Cited

U.S. PATENT DOCUMENTS

| | | | | |
|---|---|---|---|---|
| 3,319,819 A * | 5/1967 | Naujoks | ............... | A24F 15/10 221/15 |
| 4,238,051 A * | 12/1980 | Sherman | ............... | B43K 31/005 221/205 |
| 4,288,004 A * | 9/1981 | Gohringer | ............... | A24F 15/10 221/147 |
| 4,308,974 A * | 1/1982 | Jones | ............... | A61F 15/001 221/196 |
| 5,127,543 A * | 7/1992 | Meisels | ............... | A24F 15/005 221/15 |
| 5,351,857 A * | 10/1994 | Gonzalez | ............... | G07F 11/24 221/265 |
| 5,482,183 A * | 1/1996 | Beal | ............... | A61J 7/0076 221/150 A |
| 5,800,113 A * | 9/1998 | Yuyama | ............... | B65B 43/44 225/102 |
| 5,862,942 A * | 1/1999 | Yuyama | ............... | B65D 1/095 221/25 |
| 5,988,428 A * | 11/1999 | Lauer | ............... | G07F 11/34 221/19 |
| 6,152,323 A | 11/2000 | Immel | | |
| 7,918,365 B2 * | 4/2011 | White | ............... | A47F 1/087 221/123 |
| 2006/0231566 A1 * | 10/2006 | Indig | ............... | G07F 11/44 221/266 |
| 2007/0224028 A1 | 9/2007 | Lehmann | | |
| 2007/0289990 A1 * | 12/2007 | Artsiely | ............... | G07F 11/30 221/251 |
| 2008/0067188 A1 | 3/2008 | White et al. | | |
| 2009/0014461 A1 | 1/2009 | Omura et al. | | |
| 2011/0060693 A1 * | 3/2011 | Consiglio | ............... | G06Q 10/30 705/308 |
| 2013/0248555 A1 * | 9/2013 | Klier | ............... | A47G 21/12 221/254 |
| 2014/0312051 A1 * | 10/2014 | Rose, Jr. | ............... | G07F 11/30 221/124 |

FOREIGN PATENT DOCUMENTS

| | | |
|---|---|---|
| CN | 105966812 A | 9/2016 |
| CN | 205873013 U | 1/2017 |

* cited by examiner

BAFFLE BLOCKING TYPE MEDICATION DISPENSING UNIT FOR BOTTLED MEDICATION

TECHNICAL FIELD

The present invention relates to an automated pharmacy, particularly to a baffle blocking type medication dispensing unit for bottled medication. The bottled medication includes the bottled medication such as injection or oral liquid.

BACKGROUND OF INVENTION

The bottled medication refers the bottled medication such as injection or oral liquid. In the traditional hospitals or pharmacies, the method of taking bottled medicament is usually: when the patient gets the medication at the pharmacy, the pharmacist directly goes to the corresponding medication shelf to manually take the bottles according to the prescription. This kind of manual taking method is low in efficiency, error-prone, labor-intensive, and long waiting time for patients.

On the current market, most of the automatic medication dispensing devices are only suitable for boxed or bagged medication. The automatic medication dispensing devices for the bottled medication are few and the inventor of the present invention conducted many years of research on the automatic medication dispensing device for bottled medication and applied for the relevant patent in 2012. Refer to the patent literature entitled "Automated Pharmacy of Bottled Injection" with the publication number CN103373572A. The patent literature discloses an automated pharmacy for bottled injection, which comprises a frame body and a plurality of medication dispensing units composed of a medication container (referred to as a medication storage pocket in this patent literature) and a medication discharging mechanism (referred to as a sorting device in this patent literature). The medication container has many bottled injections in it and the medication container is tilted and set with a medication outlet at the bottom, while a medication discharging mechanism is set at the medication outlet; the medication discharging mechanism specifically includes a sorting turntable, and the spacing between adjacent sawteeth on the sorting turntable corresponds to the size of the bottled injection. During the operation, the bottled injection is conveyed from the medication outlet of the medication container by the rotation of the sorting turntable. The solution disclosed in the above patent literature can realize automatic medication dispersing, but there are still some shortcomings: as a lot of (multiple rows and columns) of bottled injections are placed in the medication container, the blocking is prone to happen during the process of adjacent sawteeth of sorting turntable driving the bottled injection, resulting in the unsmooth medication dispensing and the vacancy often happens in the placement position between the sawteeth of sorting turntable, and a detection device is required and the cost is increased.

DISCLOSURE OF THE INVENTION

It is an object of the present invention to provide a baffle blocking type medication dispensing unit for bottled medication, which improves the reliability of the medication dispensing.

In order to achieve the above object, the technical solution adopted by the present invention is: a baffle blocking type medication dispensing unit comprises a medication container and a medication discharging mechanism and the front end of the medication container is the medication discharging end;

The medication container comprises a bottom wall, a left wall and a right wall and the spacing between the left wall and right wall corresponds to the bottle height of the bottled medication. The bottled medication is placed flat on the bottom wall, and the left wall and right wall block the bottom of the bottle and the top of the bottle, so that the bottled medication is laid flat in the medication container in a single row; the medication container is arranged at an angle of greater than 10° between its lengthwise direction of the medication container and the horizontal plane to make the medication discharging end lower than its rear end and the opening of the medication discharging end is the medication outlet;

The medication discharging mechanism comprises a dispensing baffle and the dispensing baffle is hinged at the medication outlet, and the axial direction of the specific hinge shaft is parallel to the connection of the left wall and right wall of the medication container; the dispensing baffle comprises a straight plate portion and a blocking portion protruding upward along the straight plate portion in the medication container; the dispensing baffle is connected to a drive device and the drive device drives the dispensing baffle to turn over to have a working state of closing and blocking and a working state of turning over and opening; when the dispensing baffle is in the working state of closing and blocking, it blocks the medication outlet, and when the dispensing baffle is in the working state of turning over and opening, the dispensing baffle is turned down to be connected with the front side of the bottom wall, and the first bottled medication at the dispensing end is dispensed forward on the straight plate portion of the dispensing baffle and the blocking portion blocks the second bottled medication at the dispensing end.

In above described technical solution, an elastic strip is set at the front end of the bottom wall and the elastic strip is arranged flush along the bottom wall. When the dispensing baffle is in the working state of closing and blocking, the elastic strip is connected between the blocking portion of the dispensing baffle and front end of the bottom wall; when the dispensing baffle is in the working state of turning over and opening, the dispensing baffle is turned down to press on the elastic strip.

The working principle and effect of the present invention are as follows: the present invention designs a medication container according to the characteristics of the bottled medication, and only the single row of bottled medication could be placed flat in the medication container and the medication discharging mechanism uses the rotary dispensing baffle, so the operation process is smooth and not prone to be jammed and it has the high operation reliability, simpler structure and low cost.

In the above described drawings: 1. Medication container; 11. Bottom wall; 111. Elastic strip; 12. Left wall; 13. Right wall; 14. Medication outlet; 2. Medication discharging mechanism; 21. Dispensing baffle; 211. Straight plate portion; 212. Blocking portion; 22. Drive device; 23. Base; 3. Bottled medication.

SPECIFIC EMBODIMENT

With reference to the accompanying drawings and embodiment, the present invention will be described in detail.

Figure 1:
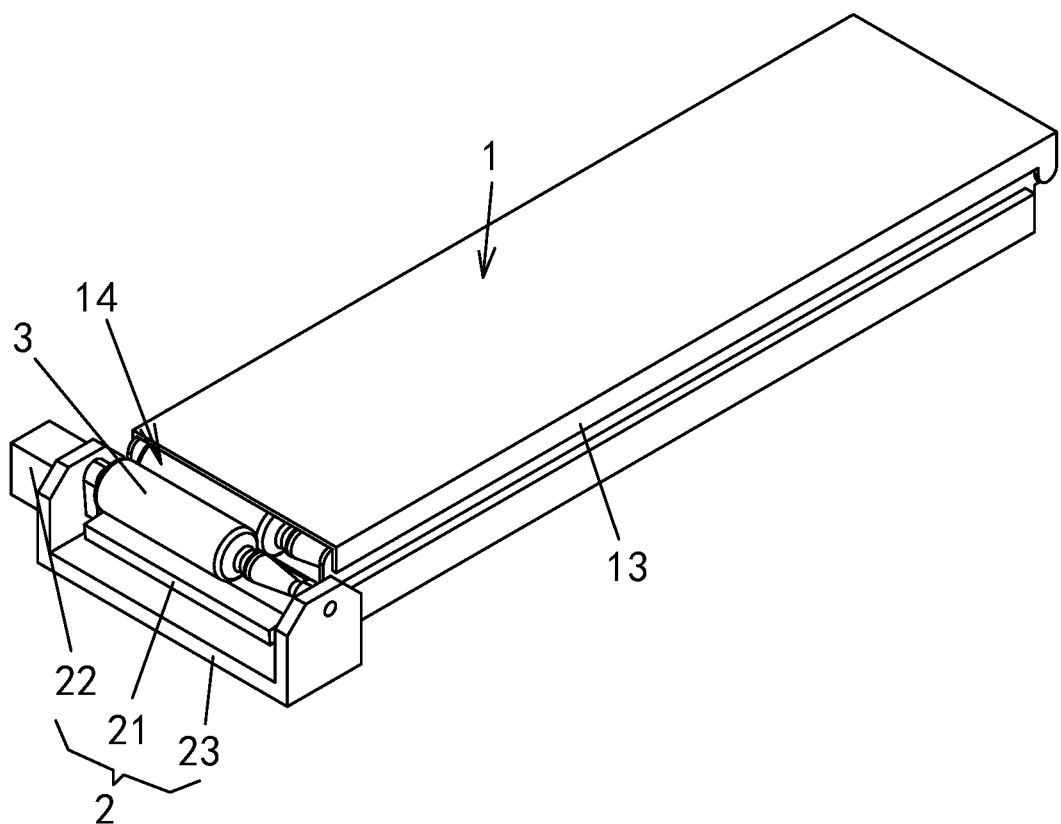
FIG. 1 is the perspective schematic view of embodiment of present invention.
Figure 2:
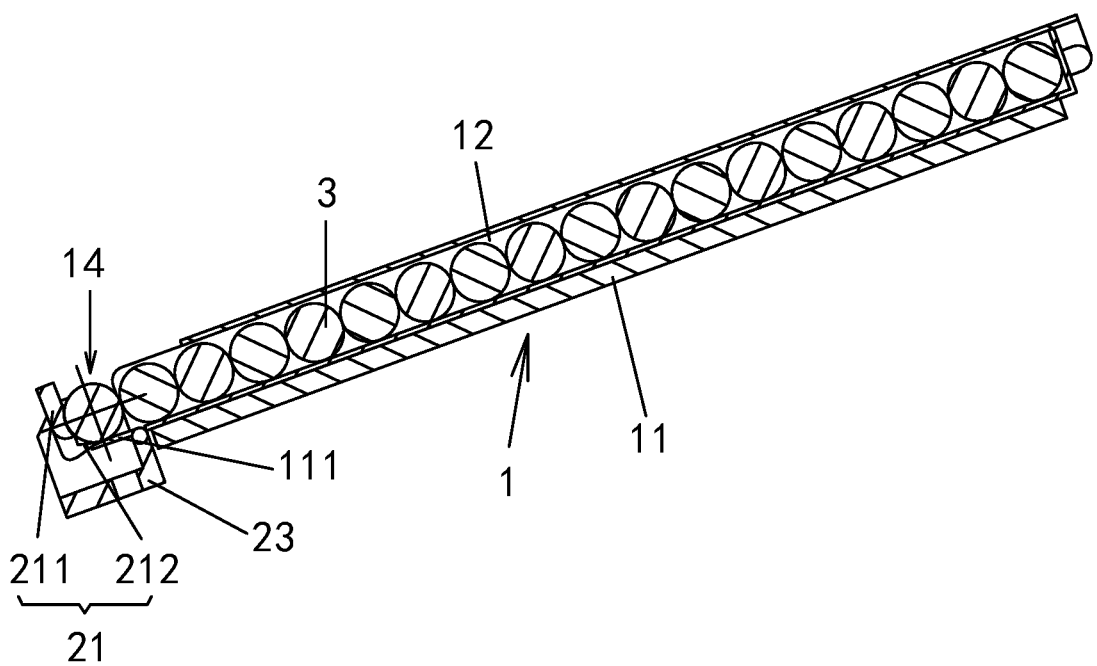
FIG. 2 is the cross-sectional view 1 of embodiment of present invention and it shows the state of initial non-dispensing state.
Figure 3:
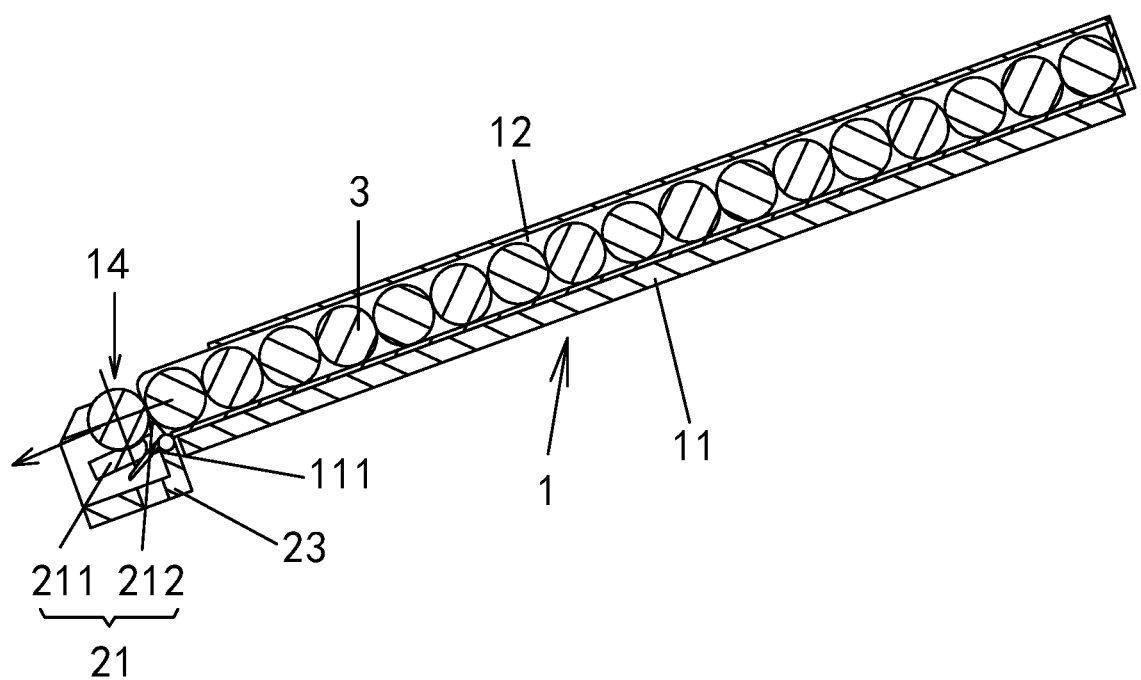
FIG. 3 is the cross-sectional view 2 of embodiment of present invention and it shows the state of instantaneous state of dispensing.

Embodiment: Refer to FIG. 1-3

A baffle blocking type medication dispensing unit for bottled medication comprises a medication container 1 and a medication discharging mechanism 2.

Refer to FIG. 1-3, the front end of the medication container 1 is the medication discharging end and the medication container 1 comprises a bottom wall 11, a left wall 12 and a right wall 13 and the spacing between the left wall 12 and right wall 13 corresponds to the bottle height of the bottled medication 3. The bottled medication 3 is placed flat on the bottom wall 11, and the left wall 12 and right wall 13 block the bottom and the top of the bottled medication 3, so that the bottled medication 3 is laid flat in the medication container 1 in a single row. The medication container 1 is arranged at an angle of greater than 10° between its lengthwise direction of the medication container 1 and the horizontal plane to make the medication discharging end lower than its rear end and the opening of the medication discharging end is the medication outlet 4.

Refer to FIG. 1-3, the medication discharging mechanism 2 comprises a dispensing baffle 21 and a drive device 22, and the dispensing baffle 21 is hinged at the medication outlet 14, and the axial direction of the specific hinge shaft is parallel to the connection of the left wall 12 and right wall 13 of the medication container 1.

Refer to FIGS. 2 and 3, the dispensing baffle 21 comprises a straight plate portion 211 and a blocking portion 212 protruding upward along the straight plate portion 211 in the medication container 1.

Refer to FIG. 1-3, the dispensing baffle 21 is connected to a drive device 22 and the drive device 22 drives the dispensing baffle 21 to turn over to have a working state of closing and blocking and a working state of turning over and opening; when the dispensing baffle 21 is in the working state of closing and blocking, it blocks the medication outlet 14, and when the dispensing baffle 21 is in the working state of turning over and opening, the dispensing baffle 21 is turned down to be connected with the front side of the bottom wall 11, and the first bottled medication 3 at the dispensing end is dispensed forward on the straight plate portion 211 of the dispensing baffle 21 and the blocking portion 212 blocks the second bottled medication 3 at the dispensing end. In order to achieve the above effect, the position of the hinge shaft of the dispensing baffle 21 shall consider the bottle diameter of the bottled medication 3. Preferably, the hinge axis of the dispensing baffle 21 should substantially coincide with the centerline position of the bottle of the first bottled medication 3 at the dispensing end.

As shown in FIGS. 2 and 3, it's preferable that an elastic strip 111 is set at the front end of the bottom wall 11 and the elastic strip 111 is arranged flush along the bottom wall 11. When the dispensing baffle 21 is in the working state of closing and blocking, the elastic strip 111 is connected between the blocking portion 212 of the dispensing baffle 21 and front end of the bottom wall 11; when the dispensing baffle 21 is in the working state of turning over and opening, the dispensing baffle 2 is turned down to press on the elastic strip 111. The main function of the elastic strip 111 is to fill in the possible gap between the blocking portion 212 and the front end of bottom wall 11 when the dispensing baffle 21 is in the working state of closing and blocking to prevent the bottled medication 3 from being caught in the gap.

In practice, if the blocking portion 212 of the dispensing baffle 21 is set longer, the elastic strip 11 is not necessary when the dispensing baffle 21 is in the working state of closing and blocking and the gap between the blocking portion 212 and the front end of bottom wall 11 is not big.

During the operation, under the initial state as shown in FIG. 2, the dispensing baffle 21 is in the working state of closing and blocking, the dispensing baffle 21 blocks the medication outlet 14, the bottled medication 3 in the medication container 1 moves to the front end (dispensing end) due to the gravity and the first bottled medication 3 presses against the straight plate portion 211 of the dispensing baffle 21; during the dispensing, the drive device 22 drives the dispensing baffle 21 to rotate to the working state of turning over and opening as shown in FIG. 3, and the dispensing baffle 21 is turned down and opened and it also supports the first bottled medication 3 to make the first bottled medication 3 roll or slide forward along the straight plate portion 211 of the dispensing baffle 21, and at the same time, the blocking portion 212 of the dispensing baffle 21 blocks the second bottled medication 3, which ensures the dispensing of one bottled medication 3 once; then the drive device 22 drives the dispensing baffle 21 to rotate back to the initial state. Its known from the above working process that the dispensing baffle 21 dispenses one bottled medication every cycle of reciprocating rotation. When a plurality of bottled medications are to be dispensed, it's only necessary to repeat several rotation cycles with accurate and reliable counting.

The medication container 1 in this embodiment can also comprise a top wall and a back wall in addition to the bottom wall 1, left wall 12 and right wall 13 to make the medication container form the closed cylindrical structure.

In this embodiment, it works when the angle between its lengthwise direction of the medication container 1 and the horizontal plane is greater than 10° and the dispensing end is the lower end. And it's feasible if the medication container 1 is placed completely vertically perpendicular to the horizontal plane.

In this embodiment, the dispensing baffle 21 can be directly hinged to the left wall 12 and the right wall 13. As shown in FIG. 1-3, the medication discharging mechanism 2 can also comprise a base 23 and the base 23 is fixed in relative to the front end of the medication container 1 and the dispensing baffle 21 is hinged to the base 23.

It should be noted that the above described embodiments are only for illustration of technical concept and characteristics of present invention with purpose of making those skilled in the art understand the present invention, and thus these embodiments shall not limit the protection range of present invention. The equivalent changes or modifications according to spiritual essence of present invention shall fall in the protection scope of present invention.

The invention claimed is:

1. A baffle blocking type medication dispensing unit for use with an annular bottled medication, the baffle blocking type medication dispensing unit comprising:
a medication container having a medication discharging end, the medication container including: (i) a bottom wall, (ii) a left wall, and (iii) a right wall, the medication container having a spacing between the left wall and right wall that is equal or greater than a bottle height of the annular bottled medication, wherein:
the bottom wall, the left wall and the right wall are configured to hold the annular bottled medication such that the annular bottled medication rolls towards the medication discharging end, and
the medication discharging end has a medication outlet through which the annular bottled medication is discharged out of the medication container; and
a medication discharging mechanism having:
a dispensing baffle that is hinged parallel to the connection of the left wall and right wall of the medication container at the medication outlet, the dispensing baffle including: (a) a straight plate portion, (b) a blocking portion protruding upward at an end of the straight plate portion, and (c) an elastic strip being arranged flush along an axial length of the bottom wall and being connected to the straight plate portion and to a front end of the bottom wall,
a drive device configured to drive the dispensing baffle to switch between: (1) a first working state of closing and blocking the medication outlet such that the annular bottled medication is prevented from being discharged through the medication outlet, and (2) a second working state of turning over and opening the medication outlet such that the annular bottled medication is discharged through the medication outlet, wherein:
in the second working state, the dispensing baffle is turned down to be connected with a front side of the bottom wall by a biasing force of the elastic strip such that a first of the annular bottled medication at the dispensing end is dispensed forward on the straight plate portion of the dispensing baffle and the blocking portion blocks a second of the annular bottled medication at the medication discharging end.

2. The baffle blocking type medication dispensing unit according to claim 1, wherein:
when the dispensing baffle is in the first working state of closing and blocking, the elastic strip is connected between the blocking portion of the dispensing baffle and front end of the bottom wall;
when the dispensing baffle is in the second working state of turning over and opening, the dispensing baffle is turned down to press on the elastic strip.

3. The baffle blocking type medication dispensing unit according to claim 1, wherein:
the annular bottled medication is placed flat on the bottom wall,
the left wall and right wall respectively block a top or bottom of the annular bottled medication, and
the annular bottled medication is laid flat in the medication container in a single row.

4. The baffle blocking type medication dispensing unit according to claim 1, wherein:
the medication container is arranged at an angle of 10° or greater between a longitudinal length of the medication container and a horizontal plane such that the medication discharging end is lower than a rear end of the medication container.

* * * * *